(12) United States Patent
Klein

(10) Patent No.: US 9,988,491 B2
(45) Date of Patent: Jun. 5, 2018

(54) METHODS AND COMPOUNDS FOR PRODUCING NYLON 6,6

(71) Applicant: EMPIRE TECHNOLOGY DEVELOPMENT LLC, Wilmington, DE (US)

(72) Inventor: Josef Peter Klein, Vashon, WA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 11 days.

(21) Appl. No.: 15/031,687

(22) PCT Filed: Oct. 22, 2013

(86) PCT No.: PCT/US2013/066136
§ 371 (c)(1),
(2) Date: Apr. 22, 2016

(87) PCT Pub. No.: WO2015/060827
PCT Pub. Date: Apr. 30, 2015

(65) Prior Publication Data
US 2016/0264733 A1 Sep. 15, 2016

(51) Int. Cl.
C08G 69/28 (2006.01)
C08G 69/26 (2006.01)
C08G 69/48 (2006.01)

(52) U.S. Cl.
CPC ............ C08G 69/28 (2013.01); C08G 69/26 (2013.01); C08G 69/48 (2013.01)

(58) Field of Classification Search
None
See application file for complete search history.

(56) References Cited

U.S. PATENT DOCUMENTS

| 3,853,961 | A  | 12/1974 | Birkenstock et al. |
| 4,681,707 | A  | 7/1987  | Alper et al. |
| 5,179,175 | A  | 1/1993  | Speranza et al. |
| 5,260,246 | A  | 11/1993 | Yuo et al. |
| 5,264,541 | A  | 11/1993 | Yuo et al. |
| 5,346,984 | A  | 9/1994  | Hasegawa et al. |
| 5,468,900 | A  | 11/1995 | Moran, Jr. et al. |
| 6,011,134 | A  | 1/2000  | Marks et al. |
| 6,040,392 | A  | 3/2000  | Khanna et al. |
| 6,075,117 | A  | 6/2000  | Hayes et al. |
| 6,331,624 | B1 | 12/2001 | Koch et al. |
| 6,362,307 | B1 | 3/2002  | Mohrschlad et al. |
| 6,437,089 | B1 | 8/2002  | Cohen et al. |
| 6,472,501 | B1 | 10/2002 | Fergusson et al. |
| 6,699,960 | B1 | 3/2004  | Ohlbach et al. |
| 6,835,800 | B2 | 12/2004 | Way et al. |
| 7,060,678 | B2 | 6/2006  | Prasad et al. |
| 7,955,479 | B2 | 6/2011  | Vanier |
| 7,977,450 | B2 | 7/2011  | Frost |
| 8,501,989 | B2 | 8/2013  | Boussie et al. |
| 8,558,018 | B2 | 10/2013 | Sanborn |
| 8,735,530 | B2 | 5/2014  | Thieblemont et al. |
| 8,859,816 | B2 | 10/2014 | Lomel |
| 9,073,844 | B2 | 7/2015  | Gossen et al. |
| 9,150,691 | B2 | 10/2015 | Jeol |
| 9,637,595 | B2 | 5/2017  | Jeol et al. |
| 2002/0183478 | A1 | 12/2002 | Fergusson et al. |
| 2003/0130478 | A1 | 7/2003  | Way et al. |
| 2003/0135018 | A1 | 7/2003  | Way et al. |
| 2004/0214982 | A1 | 10/2004 | Alsop et al. |
| 2008/0132636 | A1 | 6/2008  | Ross et al. |
| 2009/0137385 | A1 | 5/2009  | Park et al. |
| 2010/0152481 | A1 | 6/2010  | Staffel et al. |
| 2010/0317822 | A1 | 12/2010 | Boussie et al. |
| 2011/0190442 | A1 | 8/2011  | Buzinkai et al. |
| 2012/0077252 | A1 | 3/2012  | Picataggio et al. |
| 2012/0199298 | A1 | 8/2012  | Dyer |
| 2013/0095272 | A1 | 4/2013  | Carman, Jr. et al. |

FOREIGN PATENT DOCUMENTS

| CN | 101679194 A | 5/2010 |
| CN | 102356113 A | 2/2012 |
| CN | 102459214 A | 5/2012 |
| CN | 102803196 A | 11/2012 |
| CN | 103025794 A | 4/2013 |
| EP | 2941447 A1 | 11/2015 |
| GB | 924422 A | 4/1963 |
| WO | 2002098954 A1 | 12/2002 |
| WO | 2009066975 A1 | 5/2009 |
| WO | 2010105939 A1 | 9/2010 |
| WO | 2010132740 A3 | 11/2010 |
| WO | 2010144873 A1 | 12/2010 |

(Continued)

OTHER PUBLICATIONS

Almeida, V.R., et al., "Guiding and confining light in void nanostructure," Optics Letters, vol. 29, No. 1, pp. 1209-1211 (Jun. 1, 2004).
Anker, J.N., et al., "Biosensing with plasmonic nanosensors," Nature Materials, vol. 7, No. 6, pp. 442-453 (Jul. 2008).
Chen, S., et al.,"Plasmon-Enhanced Colorimetric ELISA with Single Molecule Sensitivity," Nano Letters, vol. 11, No. 4, pp. 1826-1830 (Mar. 23, 2011).
Cho, H-S., and Park, N-Y., "Serodiagnostic Comparison between Two Methods, ELISA and Surface Plasmon Resonance for the Detection of Antibodies of Classical Swine Fever," Journal of Veterinary Medical Science, vol. 68, No. 12, pp. 1327-1329 (Dec. 2006).
Extended European Search Report for counterpart Patent Application No. 13895980.4 dated May 17, 2017, pp. 8.
Extended European Search Report for counterpart Patent Application No. 13896041.4 dated May 16, 2017, pp. 11.
Ha, T., et al., "Single-molecule fluorescence spectroscopy of enzyme conformational dynamics and cleavage mechanism," Proc. Nall. Acad. Sci. USA, vol. 96, No. 3, pp. 893-898 (Feb. 1999).
Han, X.X., et al., "Surface-enhanced Raman scattering for protein detection," Anal. Bioanal. Chem., vol. 394, No. 7, pp. 1719-1727 (Aug. 2009).

(Continued)

Primary Examiner — Ana L Woodward

(57) ABSTRACT

Alternating co-polymers of cyclic dicarboxylic acids and cyclic diamines may be used to produce nylon 6,6. Di-substituted furan compounds may be used as the raw material for producing furan-dicarboxylic acids and/or furan-diamines. The furan-dicarboxylic acids and furan-diamines may be copolymerized to produce polymer precursors for nylon 6,6. The polymer precursors may be hydrogenated and/or deoxygenated to produce nylon 6,6.

21 Claims, 5 Drawing Sheets

(56) References Cited

FOREIGN PATENT DOCUMENTS

| WO | 2011149339 A1 | 12/2011 |
|---|---|---|
| WO | 2012013481 A1 | 2/2012 |
| WO | 2012022801 A1 | 2/2012 |
| WO | 2013007585 A1 | 1/2013 |
| WO | 2013109447 A1 | 7/2013 |

OTHER PUBLICATIONS

Hao, E., and Schatz, G.C., "Electromagnetic fields around silver nanoparticles and dimmers," Journal of Chemical Physics, vol. 120, No. 1, pp. 357-366 (Jan. 1, 2004).
Homola, J., "Surface Plasmon Resonance Sensors for Detection of Chemical and Biological Species," Chem. Rev., vol. 108, No. 2, pp. 462-493. (Jan. 30, 2008).
Lakowicz, J.R., "Plasmonics in Biology and Plasmon-Conlrolled Fluorescence," Plasmonics, vol. 1, No. 1, pp. 1-70 (Mar. 22, 2006).
Lakowicz, J.R., et al., "Plasmon-controlled fluorescence: a new paradigm in fluorescence spectroscopy," The Analyst, vol. 133, No. 10, pp. 1-109 (Nov. 2008).
Li et al., "Mass Synthesis of Large, Single-Crystal Au Nanosheets Based on a Polyol Process," Advanced Functional Materials, vol. 16, No. 1, pp. 83-90 (Jan. 2008).
Lofgren, J.A., et al., "Comparing ELISA and Surface Plasmon Resonance for Assessing Clinical Immunogenicity of Panitumumab," The Journal of Immunology, vol. 178, No. 11, pp. 7467-7472 (Jun. 1, 2007).
Martelli, C., et al., "Self-assembled porphyrin microrods and observation of structure-induced iridescence," Journal of Materials Chemistry, vol. 20, Issue 12, pp. 2310-2316 (Jan. 2010).
Matveeva. E., et al., "Metal-enhanced fluorescence immunoassays using total internal reflection and silver island-coaled surfaces," Analytical Biochemistry, vol. 334, Issue. 2, pp. 303-311 (Nov. 15, 2004).
McFarland, A.D., et al., "Wavelength-Scanned Surface-Enhanced Raman Excitation Spectroscopy," The Journal of Physical Chemistry, vol. 109, No. 22, pp. 11279-11285 (May 14, 2005).
Muehlschlegel. P., et al., "Resonant Optical Antennas," Science, vol. 308, No. 5728, pp. 1607-1609 (Jun. 10, 2005).
Nooney, R., et al., "Enhancing the analytical performance of immunoassays that employ metal-enhanced fluorescence," Anal Bioanal Chem, vol. 396, Issue. 3, pp. 1127-1134. (Feb. 2010).
Rica, R.D., and Stevens, M.M., "Plasmonic ELISA for the ultrasensitive detection of disease biomarkers with the naked eye," Nature Nanotechnology, vol. 7, No. 12, pp. 821-824 (Oct. 28, 2012).
Schmitt, K., et al., "Interferometric biosensor based on planar optical waveguide sensor chips for label-free detection of surface bound bioreactions," Biosensors Bioelectronics, vol. 22, Issue. 11, pp. 2591-2597 (May 15, 2007).
Sorensen, T.J., et al., "Enhanced fluorescence emission of Me-ADOTA+ by self-assembled silver nanoparticles on a gold film," Chemical Physics Letters, vol. 476, Issue 1-3, pp. 1-12 (Jul. 7, 2009).
Stuart, D.A., et al., "Biological applications of localised surface plasmonic phenomenae," IEE Proc. Nanobiotechnol, vol. 152, Issue 1, pp. 13-32 (Feb. 2005).
The Size of the Global In Vitro Diagnostic Market Was in Excess of US$ 38 Billion, accessed at http://www.reuters.com/article/idUS107243+27-May-2008+BW20080527, posted on May 27, 2008, pp. 3.
Walker, D.P., et al., "Synthesis of (±)-8-0xa-3-azabicyclo[3.2.1]octan-2-thione and (±)-2-0xa-5-azabicyclo[2.2.1] heptan-6-thione: Potential Synthons for the Preparation of Novel Heteroaryl-Annulated Bicyclic Morpholines," Synthesis, vol. 2011, No. 7, pp. 1113-1119 (Mar. 8, 2011).
Wallrabe and Periasamy, "Imaging protein molecules using FRET and FLIM microscopy," Current Opinion in Biotechnology, vol. 16, No. 1, pp. 19-27 (Feb. 2005).
Wu, F.B., et al., "Double-antigen sandwich lime-resolved immunofluorometric assay for the detection of anti-hepatitis C virus total antibodies with improved specificity and sensitivity," Journal of Medical Microbiology (2008), vol. 57, No. 8, pp. 947-953 (Aug. 2008).
Yang, W-H., et al., "Discrete dipole approximation for calculating extinction and Raman intensities for small particles with arbitrary shapes," The Journal of Chemical Physics, vol. 103, Issue. 3, pp. 869-875 (Jul. 15, 1995).
Zhou, L. et al., "Enhancement of Immunoassay's Fluorescence and Detection Sensitivity Using Three-Dimensional Plasmonic Nano-Antenna-Dots Array," Analytical Chemistry, vol. 84, No. 10, pp. 4489-4495 (Apr. 20, 2012).
Zolotavin, P., et al., "Two-photon luminescence enhancement of silver nanoclusters photodeposiled onto mesoporous $TiO_2$ film," Chemical Physics Letters, vol. 457, No. 4-6, pp. 342-346 (May 2008).
Moreau et al., Recent catalytic advances in the chemistry of substituted furans from carbohydrates and in the ensuing polymers, Topics in Catalysis (Feb. 2004), 27(1-4) pp. 11-30.
Amarasekara et al., Efficient oxidation of 5-hydroxymethylfurfural to 2,5-diformylfuran using Mn(III)-salen catalysts, Catalysis Communications(2008), (9) pp. 286-288.
Aoyama and Novak, Another Synthesis Route to New Materials: Hydrogenation of Heteroaromatic Polymers, accessed at http://www.iiis.org/cds2008/cd2008sci/SCI2008/PapersPdf/S464BA.pdf, accessed on Apr. 29, 2016, pp. 1-3.
Aoyama and Novak, Pyridine Rings as Protected 2° Amines: Facile Hydrogenation of Heterocyclic Aromatic Polymers, Macromolecules (2001), (34) pp. 6842-6844.
Block et al., Perthio- and perseleno-1,3-butadienes, -but-1-ene-3-ynes, and -[3]-cumulenes: One-step synthesis from 1,4-dilithio-1,3-butadiynes, Organic Letters (Mar. 27, 2003), 5(8) pp. 1325-1327.
Boustead, Eco-profiles of the European Plastics Industry: Polyamide 6 (Nylon 6), PlasticsEurope (Mar. 2005), pp. 1-15.
Brasholz et al., Highly efficient dehydration of carbohydrates to 5-(chloromethyl)furfural (CMF), 5-(hydroxymethyl) furfural (HMF) and levulinic acid by biphasic continuous flow processing, Green Chemistry (2011), 13(5) pp. 1114-1117.
Buntara et al., Caprolactam from Renewable Resources: Catalytic Conversion of 5-Hydroxymethylfurfural into Caprolactone, Angewandte Chemie International Edition (Jul. 25, 2011), 50(31) pp. 7083-7087.
Chakraborty et al., Cyclic trimer of 5-(aminomethyl)-2-furancarboxylic acid as a novel synthetic receptor for carboxylate recognition, Tetrahedron Letters (Feb. 11, 2002), 43(7) pp. 1317-1320.
Chang et al., The ethynylation of formaldehyde in a three-phase slurry reactor, Chemical Engineering Science (Sep.-Oct. 1992), 47(13-14) pp. 3793-3800.
Chu et al., Kinetics of the synthesis of 1,4-butynediol over copper-bismuth/magnesium silicate catalyst, Applied Catalysis A: General (Apr. 23, 1993), 97(2) pp. 123-132.
Dangerfield et al., Protecting-Group-Free Synthesis of Amines: Synthesis of Primary Amines from Aldehydes via Reductive Amination, Journal of Organic Chemistry (Jul. 28, 2010), 75(16) pp. 5470-5477.
Gehlsen and Bates, Heterogeneous Catalytic Hydrogenation of Poly(styrene): Thermodynamics of Poly (vinylcyclohexane) Containing Diblock Copolymers, Macromolecules (1993), (26) 4122-4127.
Georgieff and Richard, Diacetylene: Preparation, Purification, and Ultraviolet Spectrum, Canadian Journal of Chemistry (Sep. 1958), 36(9) pp. 1280-1283.
Herzog and Smiley, Hexamethylenediamine, Ullmann's Encyclopedia of Industrial Chemistry (2011), pp. 1-5.
Homsi and Rousseau, Halodecarboxylation of α,β-acetylenic and α,β-ethylenic acids, Tetrahedron Letters (Feb. 19, 1999), 40(8) pp. 1495-1498.
International Search Report and Written Opinion for International Application No. PCT/US2013/066171 dated Feb. 21, 2014.
International Search Report and Written Opinion for International Application No. PCT/US2013/066136 dated Feb. 24, 2014.
International Search Report and Written Opinion for International Application No. PCT/US2013/066827 dated Mar. 3, 2014.

(56) References Cited

OTHER PUBLICATIONS

Izumi, Recent advances in the photocatalytic conversion of carbon dioxide to fuels with water and/or hydrogen using solar energy and beyond, Coordination Chemistry Reviews (Jan. 2013), 257(1) pp. 171-186.
Janka et al., Synthesis of Neutral Molecular Squares Composed of Bis(phosphine)platinum Corner Units and Dialkynyl Linkers. Solid-State Characterization of [Pt(μ-C ⋮ CC ⋮ C)(dppp)]4, Organometallics (Aug. 18, 2004), 23(19) pp. 4382-4390.
Kohan et al., Polyamides, Ullmann's Encyclopedia of Industrial Chemistry (2012), (28) pp. 537-572.
Lapina et al., Reactions of alkyl (halomethyl)furancarboxylates with hexamethylenetetramine, Russian Journal of Genereal Chemistry (Aug. 2006), 76(8) pp. 1304-1309.
Lewkowski, Synthesis, chemistry and applications of 5-hydroxymethylfurfural and its derivatives, ARKIVO (2001), 2001(1) pp. 17-54.
Lichtenthaler, Carbohydrates as organic raw materials, Ullmann's Encyclopedia of Industrial Chemistry (2012), (6) pp. 583-616.
Manjolinho et al., Catalytic C—H carboxylation of terminal alkynes with carbon dioxide, American Chemical Society Catalysis (Aug. 13, 2012), 2(9) pp. 2014-2021.
Mares and Sheehan, Kinetics of Caprolactam Formation From 6-Aminocaproic Acid, Ester, and Amide, Industrial & Engineering Chemistry Process Design and Development (Jan. 1978), 17(1) pp. 9-16.
Maretina and Trofimov, Diacetylene: a candidate for industrially important reactions, Russian Chemical Reviews (Jul. 2000), 69(7) pp. 591-608.
Mascal and Nikitin, Direct, high-yield conversion of cellulose into biofuel, Angew Chem Int Ed Engl. (2008), 47(41) pp. 7924-7926.
Mascal and Nikitin, Dramatic advancements in the saccharide to 5-(chloromethyl)furfural conversion reaction, ChemSusChem (2009), 2(9) pp. 859-861.
Mascal and Nikitin, Towards the efficient, total glycan utilization of biomass, ChemSusChem (2009), 2(5) pp. 423-426.
Mei et al., TEMPO-Mediated Oxidation of Primary Alcohols to Carboxylic Acids by Exploitation of Ethers in an Aqueous-Organic Biphase System, Bulletin of the Chemical Society of Japan (2009), 82(8) pp. 1000-1002.
Mitiakoudis and Gandini, Synthesis and characterization of furanic polyamides, Macromolecules (Feb. 1991), 24(4) pp. 830-835.
Musser, Adipic Acid, Ullmann's Encyclopedia of Industrial Chemistry (2005), pp. 1-11.
Passler et al., Acetylene, Ullmann's Encyclopedia of Industrial Chemistry (2012), (1) pp. 277-326).
Ritz et al., Caprolactam, Ullmann's Encyclopedia of Industrial Chemistry (2012), pp. 1-20.
Sakurai et al., DNA-Templated Functional Group Transformations Enable Sequence-Programmed Synthesis Using Small-Molecule Reagents, Journal of American Chemical Society (Jan. 22, 2005), 127(6) pp. 1660-1661.
Stang and Learned, Generation and trapping of an alkatrienylidenecarbene, Journal of the Chemical Society, Chemical Communications (1988), (4) pp. 301-302.
Tashiro et al., Reduction of Unsaturated Aliphatic Mono- and Dicarboxylic Acids and Brominated Aliphatic Acids with Raney Alloys in an Alkaline Solution, Affording the Corresponding Saturated Aliphatic Acids, Rep. Inst. Advanced Material Study (Dec. 1988), 2(2) pp. 261-268.
Van Swieten et al., Development of an isotope-coaded activity-based probe for the quantitative profiling of cysteine proteases, Bioorganic & Medicinal Chemistry Letters (Jun. 21, 2004), 14(12) pp. 3131-3134.
Yang et al., Conversion of biomass into 5-hydroxymethylfurfural using solid acid catalyst, Bioresource Technology (Feb. 2011), 102(3) pp. 3424-3429.
Zakrzewska et al., Ionic Liquid-Mediated Formation of 5-Hydroxymethylfurfural—A Promising Biomass-Derived Building Block, Chemical Reviews (Oct. 25, 2010), 111(2) pp. 397-417.
Zhang et al., Selective Oxidation of Benzylic Alcohols and TBDMS Ethers to Carbonyl Compounds with $CrO_3$—$H_5IO_6$, Synthesis (2005), (11) pp. 1757-1760.
Zhao et al., A Novel Chromium Trioxide Catalyzed Oxidation of Primary Alcohols to Carboxylic Acids, Tetrahedron Letters (Jul. 23, 1998), 39(30) pp. 5323-5326.
Burlison and Blagg, "Syntesis and Evaluation of Coumermycin A1 Analogues that Inhibit the Hsp90 Protein Folding Machinery" Organic Letters (Sep. 20, 2006), 8(21) pp. 4855-4858.
Yu and Zhang, "Copper- and copper-N-heterocyclic carbene-catalyzed C—H activating carboxylation of terminal alkynes with $CO_2$ at ambient conditions" PNAS (Nov. 23, 2010), 107(47) pp. 20184-20189.
Xing et al., "Preparation method of haloalkane, preparation method of alkyne, reaction of alkyne, preparation method of carboxylic acid" Basic Organic Chemistry, Higher Education Press (Nov. 30, 1993), pp. 153, 218-220, 222-223, 539.
Lin et al., "Acetylene synthesis method of butyl alkyne aldehyde glycol catalyst" Petrochemical Engineering (Dec. 31, 1987), 16(5) pp. 265-269.
Ren, "Methods of producing formaldehyde with $CO_2$ catalytic hydrogenation" Formaldehyde and Methanol (Dec. 31, 2002), (3) pp. 13-15.
Graef et al., "Product Distribution in the Rapid Pyrolysis of Biomass/Lignin for Production of Acetylene", Biomass as a Nonfossil Fuel Source (Mar. 24, 2010), (15) pp. 293-312.
Johnson, A.W., "218. 2-butyne-1 : 4-diol. Part I. Reactions of the hydroxyl groups," Journal of the Chemical Society (Resumed), pp. 1009-1014 (1946).
Nozoe, T., et. Al., "Non-solvent hydrogenation of solid alkenes and alkynes with supported palladium catalysts," Solid State Ionics, vol. 141-142, pp. 695-700 (May 1, 2001).

wherein in each bracketed unit, C and A are independently and randomly any one of:

METHODS AND COMPOUNDS FOR PRODUCING NYLON 6,6

CROSS-REFERENCE TO RELATED APPLICATIONS

This application is a U.S. national stage filing under 35 U.S.C. § 371 of International Application No. PCT/US2013/066136 filed on Oct. 22, 2013 entitled "METHODS AND COMPOUNDS FOR PRODUCING NYLON 6,6," which is incorporated herein by reference in its entirety.

BACKGROUND

Nylon is a generic designation for a family of synthetic polymers known as aliphatic polyamides, and is one of the most commonly used polymers. Nylons are condensation copolymers that may be formed by reacting a diamine and a dicarboxylic acid, so that amides are formed at both ends of each monomer. The chemical constituents of nylon include carbon, hydrogen, nitrogen, and oxygen. Types of nylons are distinguished by a numerical suffix that specifies the numbers of carbons donated by the monomers, with the number of carbons from the diamine monomer listed first, followed by the number of carbons from the diacid monomer. Several representative nylons may include nylon 6,6, nylon 6, nylon 6,9, nylon 6,12, nylon 11, nylon 12 and nylon 4,6. Therefore, the variant nylon 6,6 refers to a nylon wherein the diamine (hexamethylenediamine, IUPAC name: hexane-1,6-diamine) and the diacid (adipic acid, IUPAC name: hexanedioic acid) each donate 6 carbons to the polymer chain.

The 6-carbon commodity chemicals adipic acid and hexamethylenediamine, have global production on the order of 2.5 million and 1 million metric tons per year, respectively, with most of the produced chemicals being used as monomers in the manufacture of nylon 6,6. Currently utilized industrial processes for the manufacture of adipic acid and hexamethylenediamine utilize petrochemically derived benzene or butadiene as raw materials. Efforts to replace these petrochemically derived raw materials are ongoing, and there remains a need to provide alternative scalable approaches for commercial production of nylon 6,6 from alternative raw materials.

SUMMARY

Nylon 6,6 may be produced from di-substituted furan compounds as the raw material. The di-substituted furan compounds may be converted to furan-dicarboxylic acids and/or furan-diamines. Polycondensation reactions may produce polyamides that may be further treated to produce nylon 6,6.

In an embodiment a method for producing nylon 6,6 includes converting methylfurfural of formula

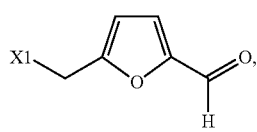

wherein X1 is —OH or -halogen, to a furan-dicarbonyl compound of formula

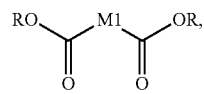

wherein M1 is

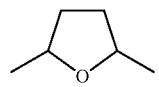

or

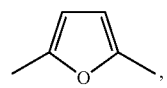

and R is H or alkyl, converting methylfurfural of formula

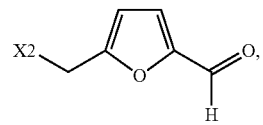

wherein X2 is —OH or -halogen, to a furan-diamine of formula

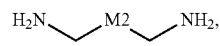

wherein M2 is

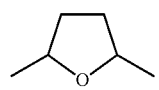

or

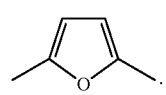

The furan-dicarbonyl compound and the furan-diamine may be copolymerized to form an alternating copolymer having the structure

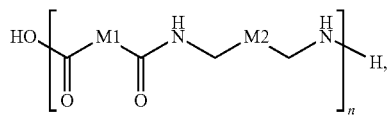

wherein n is 2 or more, and the copolymer may be converted to nylon 6,6.

In an embodiment, a method for producing nylon 6,6 includes converting methylfurfural of formula

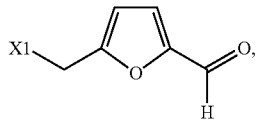

wherein X1 is —OH or -halogen, to a furan-dicarbonyl compound of formula

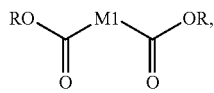

wherein M1 is

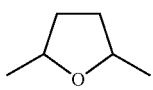

or

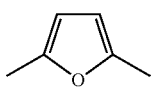

and R is H or alkyl. The furan-dicarbonyl compound may be copolymerized with hexamethylenediamine to form a polyamide having the structure

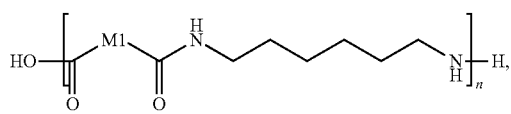

wherein n is 2 or more, and the polyamide may be converted to nylon 6,6.

In an embodiment, a method for producing nylon 6,6 includes converting methylfurfural of formula

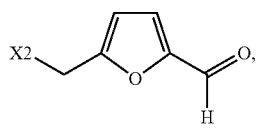

wherein X2 is —OH or -halogen, to a furan-diamine of formula

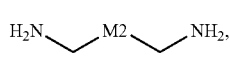

wherein M2 is

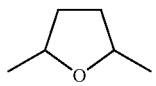

or

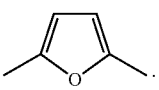

The furan-diamine may be copolymerized with adipic acid to form a polyamide having the structure

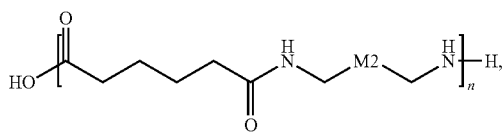

wherein n is 2 or more, and the polyamide may be converted to nylon 6,6.

In an embodiment, a compound may have a structure as represented by

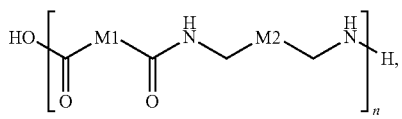

wherein n is 2 or more, and M1 and M2 are each independently at least one of

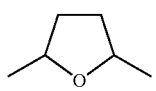

and

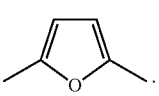

In an embodiment, a compound may have a structure as represented by

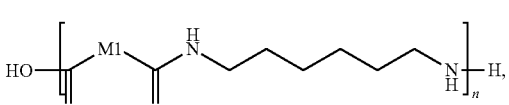

wherein n is 2 or more, and M1 is at least one of

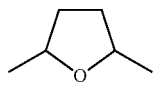

and

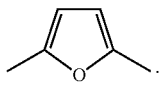

In an embodiment, a compound may have a structure as represented by

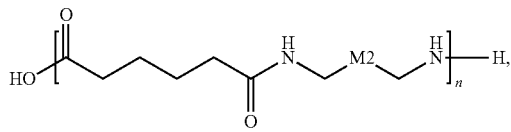

wherein n is 2 or more, and M2 is at least one of

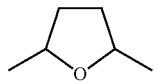

and

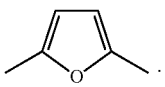

DETAILED DESCRIPTION

Nylon 6,6, as indicated above, receives its numerical designation from its monomer units, where 6 carbons may be provided by a diacid and 6 carbons may be provided by a diamine

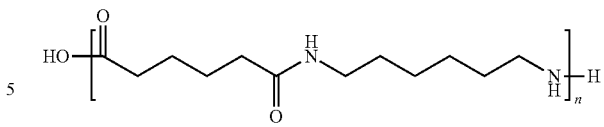

Nylon 6,6

The 6-carbon monomers that form nylon 6,6 may be designated as derivatives of adipic acid and hexamethylenediamine

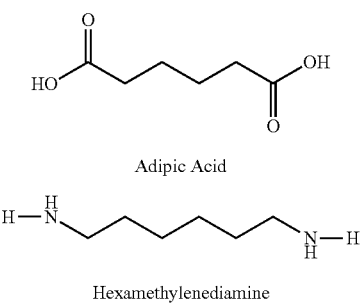

Adipic Acid

Hexamethylenediamine

In an embodiment, nylon 6,6 may be produced from 6-carbon methylfurfural compounds as the raw material.

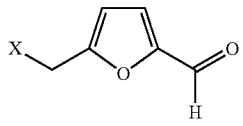

Methylfurfural where X may be —OH or -halogen.

As discussed in more detail below, methylfurfurals may be converted into diacids and diamines, and the diacids and diamines may be used for producing nylon 6,6. In an embodiment, methylfurfurals, such as 5-hydroxymethylfurfural (HMF), wherein X is —OH in the above representation, may be derived from biomass, thereby reducing the need for petrochemically derived raw materials. HMF may be produced from biomass derived cellulose or hexose monosaccharides, such as glucose and fructose, and thus may be produced from renewable biological materials or waste stream products. Hexoses may be dehydrated to produce HMF.

Figure 1:
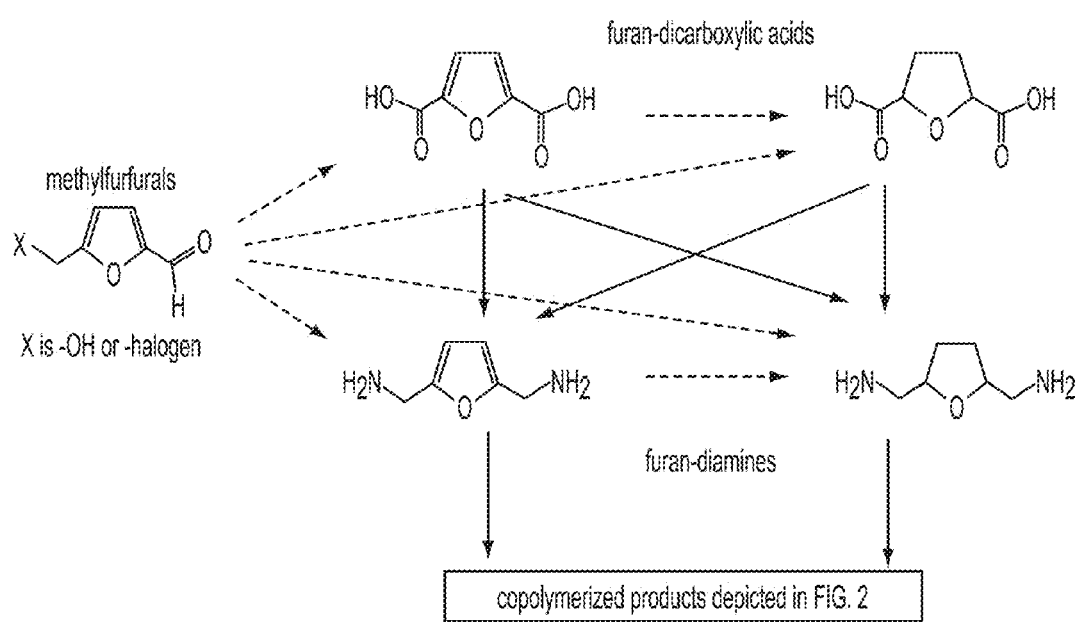
FIG. 1 depicts the use of a methylfurfural to produce furan-diamines and furan-dicarboxylic acids, and also depicts the production of copolymers from the diamines and dicarboxylic acids according to an embodiment.

As represented in FIG. 1, methylfurfurals of formula

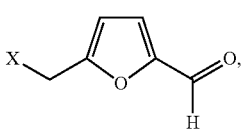

where X is either of —OH or -halogen, may be converted to either furan-dicarbonyl compounds of formula

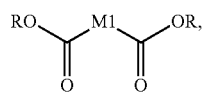

or furan-diamines of formula

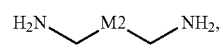

wherein M1 and M2 may independently be either tetrahydrofuran

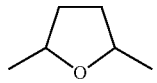

or aromatic furan

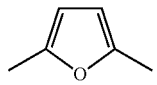

and R may be —H or alkyl.

In an embodiment wherein X in FIG. 1 is —OH, the methylfurfural will be 5-hydroxymethylfurfural. Dicarbonyl compounds may be produced by oxidation of the 5-hydroxymethylfurfural to furan-2,5-dicarboxylic acid

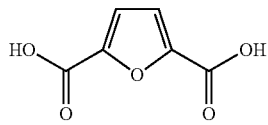 [SMILES: O=C(O)c1ccc(C(=O)O)o1]

or furan-2,5-dicarboxylic acid dimethyl ester

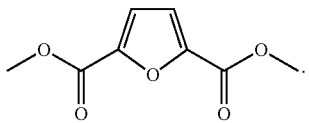

The oxidation may include combining the 5-hydroxymethylfurfural and an oxidation catalyst in a solvent to produce a first mixture, and contacting the first mixture with an oxidant. The oxidation catalyst may include an Mn(III)-salen complex, platinum, palladium, chromium (VI) oxide, pyridinium chlorochromate, bismuth (III) oxide, 2-iodoxybenzoic acid, vanadyl acetylacetonate, gold, cesium (IV) oxide, or any combination thereof. The oxidant may include sodium hypochlorite, oxygen, periodic acid, chromium (VI) oxide, pyridinium chlorochromate, hydrogen peroxide, tert-butyl hydroperoxide, potassium peroxymonosulfate, potassium permanganate, or any combination thereof.

In an embodiment, tetrahydofuran-2,5-dicarboxylic acid

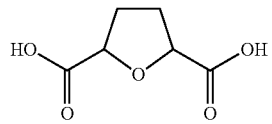

or tetrahydofuran-2,5-dicarboxylic acid dimethyl ester

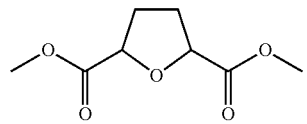

may also be produced from the 5-hydroxymethylfurfural. In one variation, for example, 5-hydroxymethylfurfural may be oxidized to furan-2,5-dicarboxylic acid, and the furan-2,5-dicarboxylic acid may be hydrogenated to produce the tetrahydofuran-2,5-dicarboxylic acid.

Diamines may be produced from the 5-hydroxymethylfurfural by oxidation of the 5-hydroxymethylfurfural to furan-2,5-dialdehyde, followed by reductive amination of the furan-2,5-dialdehyde to 2,5-bis(aminomethyl)furan

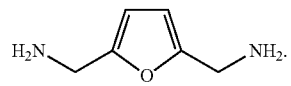

The oxidation may include combining the 5-hydroxymethylfurfural and an oxidant in a solvent with or without an oxidation catalyst. The oxidant may include oxygen, ceric ammonium nitrate, sodium hypochlorite, iodosobenzene diacetate, hydrogen peroxide, chromium (VI) oxide, pyridinium chlorochromate, a permanganate, or any combination thereof. The oxidation catalyst may include a copper (II) salt, a copper (I) salt, a cobalt (II) salt, a manganese (II) salt, ruthenium, a vanadate, iron, or any combination thereof.

Reductive amination of the furan-2,5-dialdehyde may include combining furan-2,5-dialdehyde with an ammonia equivalent in a solvent to form an intermediate diimine, and treating the intermediate diimine with a reducing agent in a solvent with or without an added reduction catalyst to produce the 2,5-bis(aminomethyl)furan. The ammonia equivalent may include ammonia, ammonium acetate, hydroxylamine, or any combination thereof. The reducing agent may include hydrogen, sodium borohydride, sodium cyanoborohydride, sodium acetoxyborohydride, or any combination thereof. The reduction catalyst may include nickel, palladium, platinum, rhodium or any combination thereof.

In an embodiment, 2,5-bis(aminomethyl)tetrahydofuran

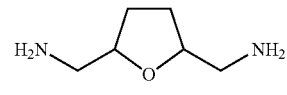

may also be produced from the 5-hydroxymethylfurfural. In one variation, 5-hydroxymethylfurfural may be oxidized to furan-2,5-dialdehyde, followed by reductive amination of the furan-2,5-dialdehyde to 2,5-bis(aminomethyl)furan, followed by hydrogenation to produce the 2,5-bis(aminoethyl)tetrahydofuran.

Figure 2:
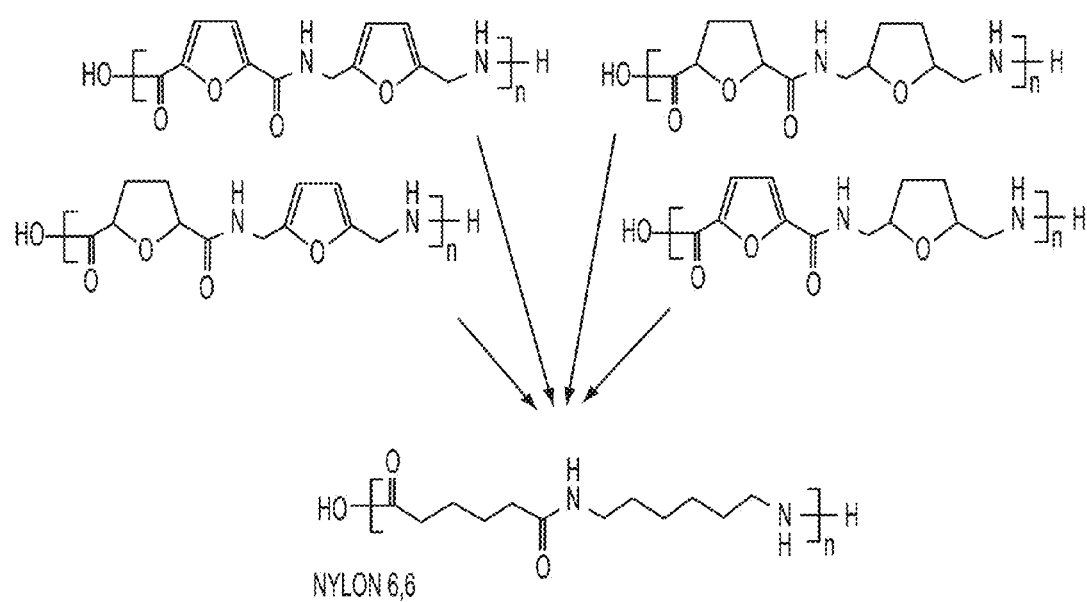
FIG. 2 depicts the copolymers of the furan-diamines and furan-dicarboxylic acids and the conversion of the copolymers to nylon 6,6 according to an embodiment.

FIG. 2 depicts various resultant copolymers that may be obtained from the furan-dicarboxylic acids and the furan-diamines depicted in FIG. 1. As shown, any of the diamines may be copolymerized with any of the dicarboxylic acids (solid lines in FIG. 1 depict polymerization combinations) to produce alternating copolymers having the structure

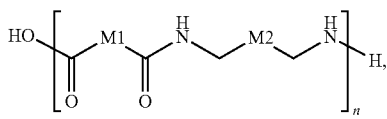

wherein n is 2 or more, and M1 and M2 may independently be tetrahydrofuran

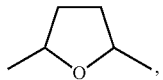

aromatic furan

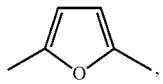

or a combination thereof.

With diamines and dicarbonyl compounds as the polymerization monomers, the copolymerization reaction may be a polycondensation reaction. In an embodiment, a polycondensation reaction may include combining a dicarbonyl compound with an activating reagent to produce an activated carboxylic acid derivative, and combining the activated carboxylic acid derivative with the furan-diamine to produce the alternating copolymer. The activating reagent may include thionyl chloride, phosphorus pentachloride, phosphorus trichloride, or N-hydroxysuccinimide with a carbodiimide.

As also generally depicted in FIG. 2, the various copolymers may be converted into nylon 6,6. In an embodiment, conversion of the copolymer to nylon 6,6 may include catalytic hydrogenation, if needed to hydrogenate any aromatic double bonds, and/or catalytic hydrodeoxygenation to open and deoxygenate the furan rings. For catalytic hydrogenation, the copolymer may be reacted with hydrogen in the presence of at least one hydrogenation catalyst and at least one solvent to convert aromatic furans to intermediary tetrahydrofurans. Catalytic hydrodeoxygenation may be done to react intermediary tetrahydrofurans with hydrogen in the presence of at least one hydrodeoxygenation catalyst, at least one solvent, and at least one halogen source to deoxygenate the tetrahydrofurans, open the rings, and produce nylon 6,6.

The catalysts for the hydrogenation and catalytic hydrodeoxygenation may include platinum, palladium, rhodium, ruthenium, nickel, cobalt, iron, molybdenum, iridium, rhenium, gold, or any combination thereof. The halogen source for the catalytic hydrodeoxygenation may include hydrogen iodide, hydrogen bromide or a combination thereof, and the solvent for the hydrogenation and catalytic hydrodeoxygenation may include water, acetic acid, propionic acid, butyric acid, ethanol, isopropanol, tert-butanol, dimethylformamide, dimethylacetamide N-methylpyrrolidinone, dimethylsulfoxide, ethyl acetate, toluene, or any combination thereof.

Figure 3:
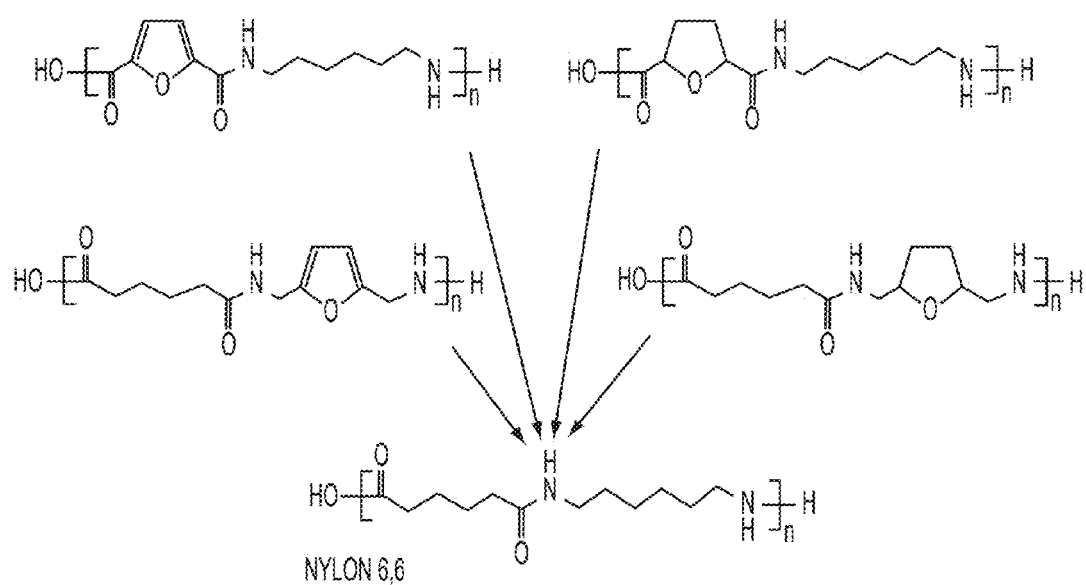
FIG. 3 depicts the alternate copolymers of the furan-diamines and furan-dicarboxylic acids and the conversion of the copolymers to nylon 6,6 according to an embodiment.
Figure 4:
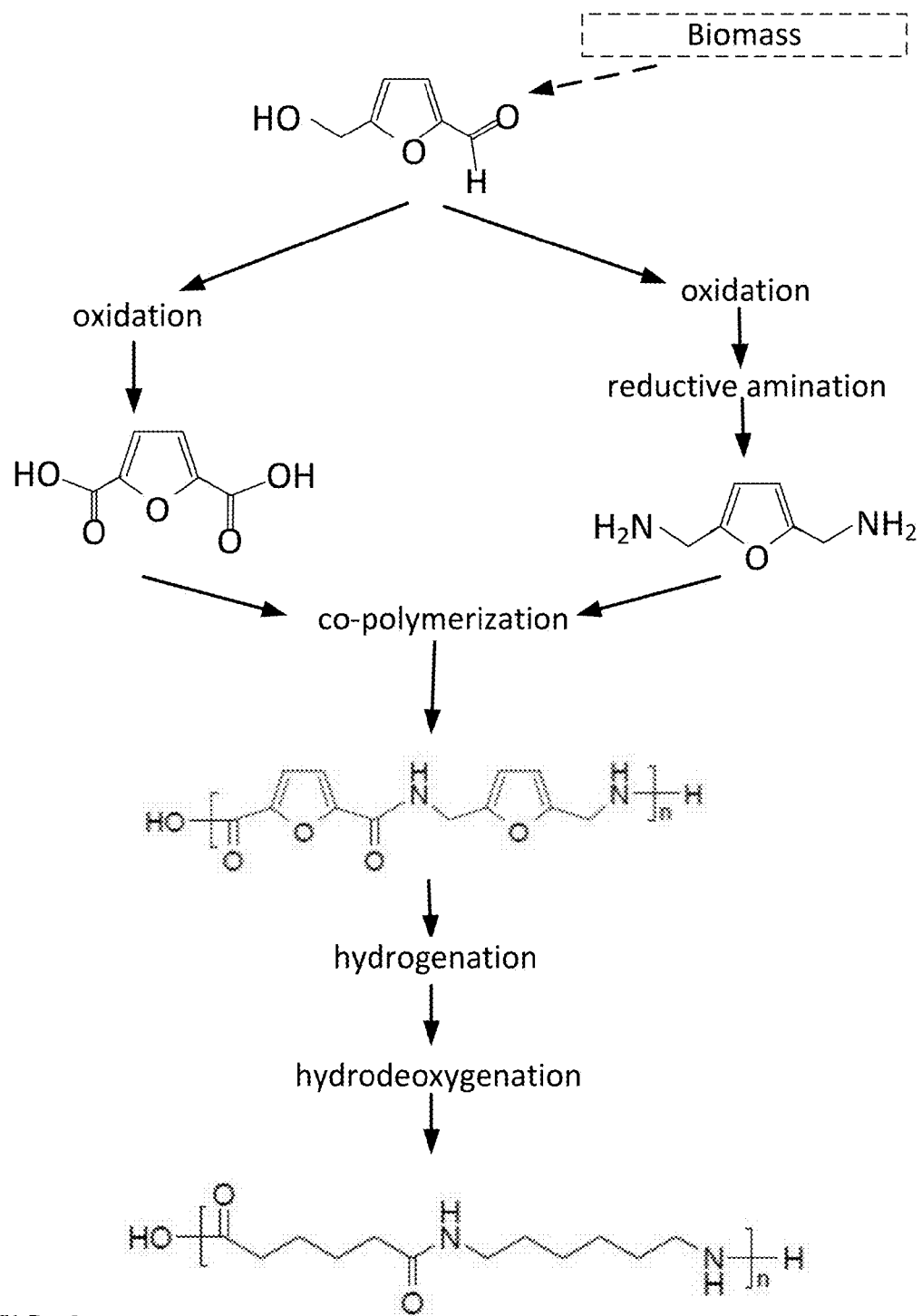
FIG. 4 depicts one method for using 5-hydroxymethyl-furfural to produce nylon 6,6 according to an embodiment.

As discussed above, furan-2,5-dicarboxylic acid and tetrahydrofuran-2,5-dicarboxylic acid may be copolymerized with either 2,5-bis(aminomethyl)furan or 2,5-bis(aminoethyl)tetrahydofuran to produce any of the four copolymers shown in FIG. 2. In alternative embodiments as shown in FIG. 3, and using similar procedures to those discussed above, the furan-2,5-dicarboxylic acid and tetrahydrofuran-2,5-dicarboxylic acid may also be copolymerized with hexamethylenediamine to produce a copolymer of generic formula

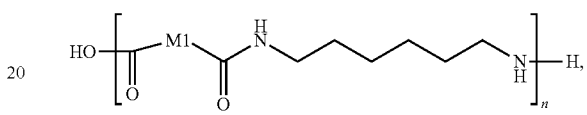

wherein M1 is at least one of

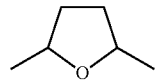

and

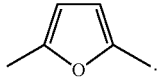

As represented in FIG. 3, the copolymers with hexamethylenediamine may also by hydrogenated and/or deoxygenated as discussed above to produce nylon 6,6.

In an embodiment, instead of copolymerizing hexamethylenediamine with either furan-2,5-dicarboxylic acid or tetrahydrofuran-2,5-dicarboxylic acid, the copolymer with hexamethylenediamine (upper two copolymers in FIG. 3) may be produced by copolymerizing hexamethylenediamine with furan-2,5-dicarboxylic acid dimethyl ester or tetrahydrofuran-2,5-dicarboxylic acid dimethyl ester. In another alternative embodiment (not shown), either, or both of the furan-2,5-dicarboxylic acid dimethyl ester or tetrahydrofuran-2,5-dicarboxylic acid dimethyl ester may be reacted with either, or both of the 2,5-bis(aminomethyl)furan or 2,5-bis(aminomethyl)tetrahydofuran to produce the precursor copolymers shown in FIG. 2.

The dimethyl esters may also be produced from 5-hydroxymethylfurfural. For example, 5-hydroxymethylfurfural may be treated with oxygen gas in the presence of a solvent and catalyst to furan-2,5-dicarboxylic acid dimethyl ester.

In alternative embodiments, and using similar procedures to those discussed above, the 2,5-bis(aminomethyl)furan or 2,5-bis(aminomethyl)tetrahydofuran may also be copolymerized with adipoyl chloride to produce a copolymer of generic formula

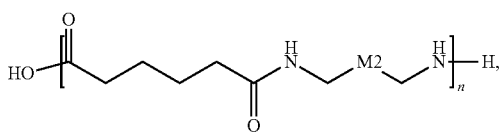

wherein M2 is at least one of

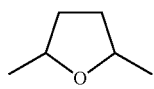

and

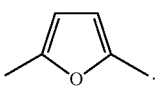

As represented in FIG. 3 the copolymers with adipic acid may also by hydrogenated and/or deoxygenated as discussed above to produce nylon 6,6.

Figure 5:
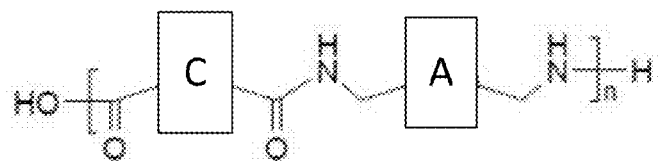
FIG. 5 depicts a random copolymer precursor of diamines and dicarboxylic acids according to an embodiment.
Figure 5:

In variations of the above reactions, any one, or a combination of any of 2,5-bis(aminomethyl)furan, 2,5-bis(aminomethyl)tetrahydofuran, and hexamethylenediamine may be copolymerized with any one, or a combination of furan-2,5-dicarboxylic acid, tetrahydofuran-2,5-dicarboxylic acid, furan-2,5-dicarboxylic acid dimethyl ester, tetrahydrofuran-2,5-dicarboxylic acid dimethyl ester, and adipoyl chloride to produce a variety of different copolymer precursors for nylon 6,6. With mixtures of carboxyl and amine reactants, the units that form the copolymers (carboxyl units and amine units) may be random through the length of the copolymer. FIG. 5 provides a representation of a random copolymer precursor that may be produced with a mixture of all eight of the reactants presented directly above.

In view of the above discussion, biomass constituents may be used to produce polymer precursors for nylon 6,6, some of which (4) are shown in FIG. 2 and some of which (4) four are shown in FIG. 3.

EXAMPLES

Example 1: First Polymer Precursor for Nylon 6,6

FIG. 3 depicts a representation of a method for producing a nylon 6,6 precursor from 5-hydroxymethylfurfural. The 5-hydroxymethylfurfural is obtained from biomass, such as biomass derived cellulose, hexose, or may also be obtained from alternative non-petrochemical sources.

In a first reaction process, a mixture of 5-hydroxymethylfurfural (1 equivalent), 10% platinum on activated carbon, and aqueous sodium carbonate solution (1 equivalent) is treated with oxygen gas (about 150 psi) while heating at about 100° C. After about 2 hours, the catalyst is removed by filtration. The filtrate is treated with 10% hydrochloric acid (2.2 equivalents). The solid is filtered, washed with water and dried under reduced pressure to yield furan-2,5-dicarboxylic acid. Thionyl chloride (3 equivalents) containing 1% dimethylformamide is added slowly to solid furan-2,5-dicarboxylic acid (1 equivalent). The mixture is heated at about 80° C. for about 4 hours. The evolved gas is trapped by bubbling through aqueous potassium hydroxide solution. When gas evolution ceases, the unreacted thionyl chloride is removed by atmospheric pressure distillation. Vacuum distillation of the residue (110° C., 9 mm Hg) yields furan-2,5-dicarbonyl dichloride.

In a second process, a mixture of 5-hydroxymethylfurfural (1 equivalent), ruthenium on activated carbon catalyst (0.01 equivalent metal) and toluene as solvent is treated with oxygen gas (about 290 psi) while heating at about 110° C. for about 1 hour. After filtration to remove the catalyst the toluene is removed by evaporation under reduced pressure to yield 2,5-diformylfuran. A mixture of 2,5-diformylfuran (1 equivalent), hydroxylamine hydrochloride (2 equivalents), potassium acetate (2 equivalents) and 50% aqueous ethanol is heated at about 50° C. for about 1 hour. The precipitate is filtered, washed with water and dried under reduced pressure to yield 2,5-diformylfuran dioxime. A mixture of 2,5-diformylfuran dioxime (1 equivalent), Raney nickel (about 5 grams per mmol of dioxime) and tetrahydrofuran as solvent is treated with hydrogen gas (about 50 bar) in an autoclave. When no more hydrogen is absorbed, the catalyst is removed by filtration under argon gas and rinsed with tetrahydrofuran. The combined filtrates are concentrated under reduced pressure to yield 2,5-bis(aminomethyl)furan that is purified by recrystallization of its dihydrobromide salt.

The furan-2,5-dicarbonyl dichloride from the first process and the dihydrobromide salt of 2,5-bis(aminomethyl)furan are then combined to produce the first polymer precursor. The dihydrobromide salt of 2,5-bis(aminomethyl)furan (1 equivalent) is dissolved in aqueous potassium hydroxide solution. To this solution, cooled in an ice bath, is added a solution of furan-2,5-dicarbonyl dichloride (1 equivalent) in dichloromethane as solvent. The mixture is stirred vigorously for about 30 minutes, treated with methanol and filtered. The solid is washed with water and methanol and then dried under reduced pressure to yield the first precursor polymer

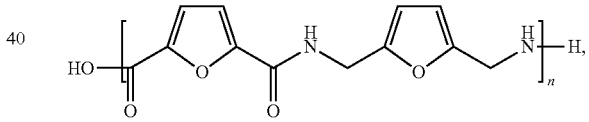

where n is about 5 to about 1000.

Example 2: Second Polymer Precursor for Nylon 6,6

An alternative nylon 6,6 precursor may also be produced from 5-hydroxymethylfurfural. The 5-hydroxymethylfurfural is obtained from biomass, such as biomass derived cellulose, hexose, or may also be obtained from alternative non-petrochemical sources.

In a first reaction process, a mixture of 5-hydroxymethylfurfural (1 equivalent), 10% platinum on activated carbon, and aqueous sodium carbonate solution (1 equivalent) is treated with oxygen gas (about 150 psi) while heating at about 100° C. After about 2 hours, the catalyst is removed by filtration. The filtrate is treated with 10% hydrochloric acid (2.2 equivalents). The solid is filtered, washed with water and dried under reduced pressure to yield furan-2,5-dicarboxylic acid. Thionyl chloride (3 equivalents) containing 1% dimethylformamide is added slowly to solid furan-2,5-dicarboxylic acid (1 equivalent). The mixture is heated at about 80° C. for about 4 hours. The evolved gas is trapped by bubbling through aqueous potassium hydroxide solution.

When gas evolution ceases, the unreacted thionyl chloride is removed by atmospheric pressure distillation. Vacuum distillation of the residue (110° C., 9 mm Hg) yields furan-2,5-dicarbonyl dichloride.

Then, instead of the 2,5-bis(aminomethyl)furan, hexamethylenediamine is copolymerized with the furan-2,5-dicarbonyl chloride to produce the second polymer precursor. The hexamethylenediamine (1 equivalent) is dissolved in aqueous potassium hydroxide solution. To this solution, cooled in an ice bath, is added a solution of furan-2,5-dicarbonyl dichloride (1 equivalent) in dichloromethane as solvent. The mixture is stirred vigorously for about 30 minutes, treated with methanol and filtered. The solid is washed with water and methanol and then dried under reduced pressure to yield the second precursor polymer

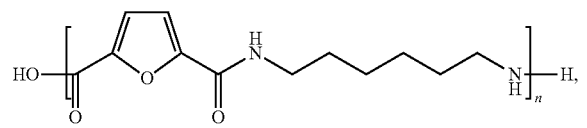

where n is about 5 to about 1000.

Alternatively, the second polymer precursor may be produced by copolymerizing furan-2,5-dicarboxylic acid dimethyl ester with hexamethylenediamine. A mixture of 5-hydroxymethylfurfural (1 equivalent), 2.1% gold on cesium (IV) oxide nanoparticles (0.003 equivalent gold) and methanol is heated at about 130° C. while treating with oxygen gas (about 10 bar). After about 5 hours, the catalyst is removed by filtration and the filtrate is concentrated under reduced pressure to yield furan-2,5-dicarboxylic acid dimethyl ester. A mixture of furan-2,5-dicarboxylic acid dimethyl ester (1 equivalent) and hexamethylenediamine is heated at about 160° C. for about 3 hours to yield the second polymer precursor.

Example 3: Third Polymer Precursor for Nylon 6,6

An alternative nylon 6,6 precursor may also be produced from 5-hydroxymethylfurfural. The 5-hydroxymethylfurfural is obtained from biomass, such as biomass derived cellulose, hexose, or may also be obtained from alternative non-petrochemical sources.

A mixture of 5-hydroxymethylfurfural (1 equivalent), ruthenium on activated carbon catalyst (0.01 equivalent metal) and toluene as solvent is treated with oxygen gas (about 290 psi) while heating at about 110° C. for about 1 hour. After filtration to remove the catalyst the toluene is removed by evaporation under reduced pressure to yield 2,5-diformylfuran. A mixture of 2,5-diformylfuran (1 equivalent), hydroxylamine hydrochloride (2 equivalents), potassium acetate (2 equivalents) and 50% aqueous ethanol is heated at about 50° C. for about 1 hour. The precipitate is filtered, washed with water and dried under reduced pressure to yield 2,5-diformylfuran dioxime. A mixture of 2,5-diformylfuran dioxime (1 equivalent), Raney nickel (about 5 grams per mmol of dioxime) and tetrahydrofuran as solvent is treated with hydrogen gas (about 50 bar) in an autoclave. When no more hydrogen is absorbed, the catalyst is removed by filtration under argon gas and rinsed with tetrahydrofuran. The combined filtrates are concentrated under reduced pressure to yield 2,5-bis(aminomethyl)furan that is purified by recrystallization of its dihydrobromide salt.

Then, instead of furan-2,5-dicarbonyl dichloride, adipoyl chloride is copolymerized with dihydrobromide salt of 2,5-bis(aminomethyl)furan to produce the third polymer precursor. The dihydrobromide salt of 2,5-bis(aminomethyl)furan (1 equivalent) is dissolved in aqueous potassium hydroxide solution. To this solution, cooled in an ice bath, is added a solution of adipoyl chloride (1 equivalent) in dichloromethane as solvent. The mixture is stirred vigorously for about 30 minutes, treated with methanol and filtered. The solid is washed with water and methanol and then dried under reduced pressure to yield the polymer

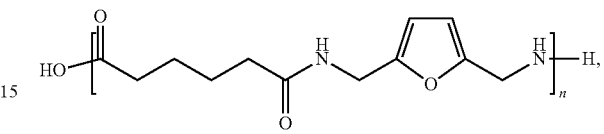

where n is about 5 to about 1000.

Example 4: Production of Nylon 6,6

A mixture of any one, or a combination of any of the polymers from Examples 1-3 (1 equivalent), 5% palladium on silica (0.01 equivalent palladium), hydrogen iodide (1 equivalent) and acetic acid solvent is heated at about 160° C. while treating with hydrogen gas (about 50 atmospheres). After about 3 hours, the mixture is cooled and filtered to remove the catalyst. The solvent is removed by distillation under reduced pressure. Salts are removed by washing the residue with water yielding nylon 6,6.

Therefore, the Examples demonstrate that nylon 6,6 can be produced from methylfurfurals that are derived from biomass, thereby reducing the need for petrochemically derived raw materials.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and one or more to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for producing nylon 6,6, the method comprising:

converting methylfurfural of formula

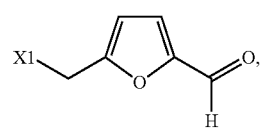

wherein

X1 is —OH or -halogen, to a furan-dicarbonyl compound of formula

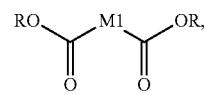

wherein
M1 is

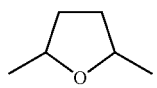

or

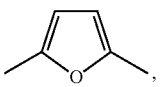

and
R is H, or alkyl;
converting methylfurfural of formula

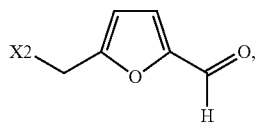

wherein
X2 is —OH or -halogen,
to a furan-diamine of formula

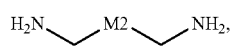

wherein
M2 is

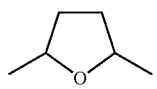

or

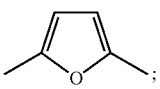

reacting the furan-dicarbonyl compound with the furan-diamine to form a polymer having the structure

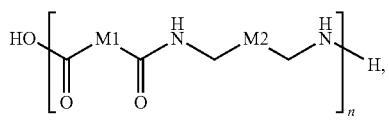

wherein
n is 2 or more; and
converting the polymer to nylon 6,6 by catalytic hydrogenation, catalytic hydrodeoxygenation, or a combination thereof.

2. The method of claim 1, wherein converting the polymer to nylon 6,6 comprises performing a catalytic hydrogenation reaction and catalytic hydrodeoxygenation reaction, wherein M1 and M2 are

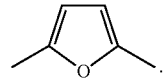

3. The method of claim 2, wherein performing the catalytic hydrogenation reaction comprises reacting the polymer

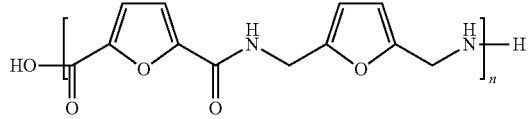

with hydrogen in the presence of at least one hydrogenation catalyst and at least one solvent to produce an intermediate tetrahydrofuran polymer

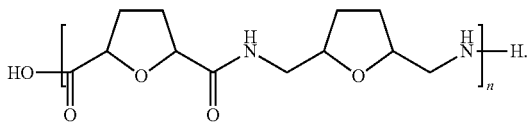

4. The method of claim 3, wherein reacting the polymer with hydrogen comprises reacting the polymer in the presence of at least one hydrogenation catalyst including platinum, palladium, rhodium, ruthenium, nickel, cobalt, iron, molybdenum, iridium, rhenium or gold.

5. The method of claim 2, wherein the catalytic hydrodeoxygenation reaction comprises reacting the intermediate tetrahydrofuran polymer with hydrogen in the presence of at least one hydrodeoxygenation catalyst, at least one solvent, and at least one halogen source to produce the nylon 6,6 and, wherein the hydrodeoxygenation catalyst comprises platinum, palladium, rhodium, ruthenium, nickel, cobalt, iron, molybdenum, iridium, rhenium, gold, or any combination thereof, and the halogen source comprises hydrogen iodide, hydrogen bromide or a combination thereof.

6. The method of claim 1, wherein converting the methylfurfural to a furan-dicarbonyl compound comprises oxidizing 5-hydroxymethylfurfural to furan-2,5-dicarboxylic acid.

7. The method of claim 6, wherein oxidizing comprises combining 5-hydroxymethylfurfural and an oxidation catalyst in a solvent to produce a first mixture, and contacting the first mixture with an oxidant, wherein the oxidation catalyst comprises Mn(III)-salen complex, platinum, palladium, chromium (VI) oxide, pyridinium chlorochromate, bismuth (III) oxide, 2-iodoxybenzoic acid, vanadyl acetylacetonate, or any combination thereof, and the oxidant comprises sodium hypochlorite, oxygen, periodic acid, chromium (VI) oxide, pyridinium chlorochromate, hydrogen peroxide, tert-butyl hydroperoxide, potassium peroxymonosulfate, potassium permanganate, or any combination thereof.

8. The method of claim 1, wherein converting methylfurfural to furan-diamine comprises oxidizing 5-hydroxymethylfurfural to furan-2,5-dialdehyde, and performing a reductive amination of the furan-2,5-dialdehyde.

9. The method of claim 8, wherein oxidizing 5-hydroxymethylfurfural includes combining 5-hydroxymethylfurfural and an oxidant in a solvent.

10. The method of claim 9, wherein the combining comprises combining with oxygen, ceric ammonium nitrate, sodium hypochlorite, iodosobenzene diacetate, hydrogen peroxide, chromium (VI) oxide, pyridinium chlorochromate, permanganate, or any combination thereof.

11. The method of claim 9, wherein the oxidizing comprises combining 5-hydroxymethylfurfural and an oxidant in a solvent including an oxidation catalyst.

12. The method of claim 11, wherein the combining comprises combining with an oxidation catalyst including a copper (II) salt, a copper (I) salt, a cobalt (II) salt, a manganese (II) salt, ruthenium, a vanadate, iron, or any combination thereof.

13. The method of claim 8, wherein performing a reductive amination of furan-2,5-dialdehyde comprises:
    combining furan-2,5-dialdehyde with ammonia or an ammonia equivalent in a solvent to form an intermediate diimine; and
    treating the intermediate diimine with a reducing agent in a solvent to produce 2,5-bis(aminomethyl)furan.

14. The method of claim 13, wherein the combining furan-2,5-dialdehyde with an ammonia equivalent comprises combining with ammonium acetate, hydroxylamine, or any combination thereof; and
    the treating comprises treating with hydrogen, sodium borohydride, sodium cyanoborohydride, sodium acetoxyborohydride, or any combination thereof.

15. The method of claim 8, further comprising producing the 5-hydroxymethylfurfural from biomass.

16. The method of claim 15, wherein producing the 5-hydroxymethylfurfural from biomass comprises:
    isolating hexoses from the biomass; and
    dehydrating the hexoses to form the 5-hydroxymethylfurfural.

17. The method of claim 1, wherein the reacting comprises polymerizing via a polycondensation reaction.

18. The method of claim 17, wherein polymerizing via a polycondensation reaction comprises:
    combining the furan-dicarbonyl compound with an activating reagent to produce an activated carboxylic acid derivative; and
    combining the activated carboxylic acid derivative with the furan-diamine to produce the alternating copolymer.

19. The method of claim 18, wherein combining the furan-dicarbonyl compound comprises combining with an activating reagent including thionyl chloride or N-hydroxysuccinimide with a carbodiimide.

20. The method of claim 1, wherein converting methylfurfural comprises converting 5-hydroxymethyl furfural, and converting the methylfurfural to a furan-dicarbonyl compound comprises a catalytic oxygenation of the 5-hydroxymethyl furfural to one or more of furan-2,5-dicarboxylic acid dimethyl ester, tetrahydrofuran-2,5-dicarboxylic acid dimethyl ester.

21. The method of claim 1, wherein reacting comprises forming the polymer where n is about 5 to about 1000.

* * * * *